United States Patent
Rentel et al.

(10) Patent No.: US 11,848,581 B2
(45) Date of Patent: Dec. 19, 2023

(54) SOURCE BOOTSTRAP POWER CONVERSION FOR THE SAFE AND EFFICIENT INTERCONNECTION OF HOMOGENEOUS OR HETEROGENEOUS ENERGY STORAGE MODULES

(71) Applicant: X-wave Innovations, Inc., Gaithersburg, MD (US)

(72) Inventors: Carlos Rentel, Poolesville, MD (US); Hunter Jones, Silver Spring, MD (US)

(73) Assignee: X-Wave Innovations, Inc., Gaithersburg, MD (US)

( * ) Notice: Subject to any disclaimer, the term of this patent is extended or adjusted under 35 U.S.C. 154(b) by 0 days.

(21) Appl. No.: 16/900,901

(22) Filed: Jun. 13, 2020

(65) Prior Publication Data
US 2021/0006075 A1    Jan. 7, 2021

Related U.S. Application Data

(60) Provisional application No. 62/861,380, filed on Jun. 14, 2019.

(51) Int. Cl.
*H02J 7/00* (2006.01)
*H01M 10/44* (2006.01)
*H01M 10/42* (2006.01)

(52) U.S. Cl.
CPC ......... *H02J 7/0014* (2013.01); *H01M 10/441* (2013.01); *H02J 7/0024* (2013.01); *H02J 7/0063* (2013.01); *H02J 7/00714* (2020.01); *H02J 7/007182* (2020.01); *H01M 2010/4271* (2013.01); *H02J 7/0013* (2013.01); *H02J 2207/20* (2020.01)

(58) Field of Classification Search
CPC ...... H02J 7/0014; H02J 7/0024; H02J 7/0063; H02J 7/00714; H02J 7/007182; H01M 10/441
USPC ....................................................... 320/116
See application file for complete search history.

(56) References Cited

U.S. PATENT DOCUMENTS 5,264,777 A * 11/1993 Smead ............... H02J 7/0024
                                                 320/128
6,034,506 A * 3/2000 Hall ....................... H02J 7/35
                                                 320/101

(Continued)

OTHER PUBLICATIONS

Hua Chen, Hyeokjin Kim, Robert Erickson, and Dragan Maksimovic, "Electrified Automotive Powertrain Architecture Using Composite DC-DC Converters" IEEE Transactions On Power Electronics Dec. 2015.

(Continued)

*Primary Examiner* — John T Trischler
(74) *Attorney, Agent, or Firm* — Sheets Law PLLC; Kendal M. Sheets

(57) ABSTRACT

The invention includes devices and methods used to regulate the power, voltage and/or current out of an individual energy storage module. A plurality of energy storage modules and/or individual interconnected energy storage modules can form an energy storage system when interconnected in series, parallel or series/parallel. The invention includes a method for storing and delivering energy, comprising providing an energy storage module for boosting the voltage of the energy storage component while delivering power to a load.

8 Claims, 11 Drawing Sheets

(56) References Cited

U.S. PATENT DOCUMENTS

| | | | | |
|---|---|---|---|---|
| 6,304,467 B1* | 10/2001 | Nebrigic | | H02M 3/1588 363/49 |
| 6,310,789 B1* | 10/2001 | Nebrigic | | H02M 3/1588 363/60 |
| 6,370,046 B1* | 4/2002 | Nebrigic | | H02M 3/07 363/59 |
| 6,643,151 B1* | 11/2003 | Nebrigic | | H01M 10/488 363/124 |
| 7,141,892 B2* | 11/2006 | Dai | | H02J 9/062 307/64 |
| 7,193,392 B2* | 3/2007 | King | | B60L 58/18 320/118 |
| 7,245,108 B2* | 7/2007 | Chertok | | B60L 58/18 320/132 |
| 7,274,116 B2* | 9/2007 | Inoue | | H02J 7/0063 307/100 |
| 7,378,818 B2* | 5/2008 | Fowler | | H01M 10/441 320/108 |
| 7,667,482 B2* | 2/2010 | Mort | | G01R 15/14 324/508 |
| 7,737,580 B2* | 6/2010 | Hjort | | H02J 9/062 307/64 |
| 7,855,472 B2* | 12/2010 | Hjort | | H02J 9/062 307/64 |
| 7,940,016 B2* | 5/2011 | Donnelly | | B60L 7/18 318/370 |
| 8,053,927 B2* | 11/2011 | Hjort | | H02J 7/0047 307/64 |
| 8,773,065 B2* | 7/2014 | Ang | | B60L 53/14 320/140 |
| 9,005,832 B2* | 4/2015 | ÅStrom | | H01M 8/0491 363/21.04 |
| 9,088,224 B2* | 7/2015 | Chen | | H02M 3/155 |
| 9,276,428 B2* | 3/2016 | Chuang | | H02J 7/0063 |
| 9,461,487 B2* | 10/2016 | Negru | | H02M 3/04 |
| 9,525,290 B2* | 12/2016 | Snyder | | H02J 7/0016 |
| 9,527,401 B2* | 12/2016 | Le | | B60L 53/22 |
| 9,608,451 B2* | 3/2017 | Sugeno | | H02J 3/14 |
| 9,718,375 B2* | 8/2017 | Le | | B60L 1/003 |
| 9,742,275 B2* | 8/2017 | Chen | | B60L 15/007 |
| 9,834,098 B2* | 12/2017 | King | | B60L 58/18 |
| 9,834,102 B2* | 12/2017 | Nakaya | | B60L 53/65 |
| 9,910,471 B1* | 3/2018 | Marr | | G06F 1/26 |
| 9,942,956 B1* | 4/2018 | Chen | | H05B 45/397 |
| 9,969,292 B2* | 5/2018 | Thieme | | B60R 16/03 |
| 10,008,872 B2* | 6/2018 | Roohparvar | | H01M 50/543 |
| 10,033,199 B2* | 7/2018 | Negru | | G06F 1/26 |
| 10,075,007 B2* | 9/2018 | Langlinais | | H02J 7/00714 |
| 10,110,103 B1* | 10/2018 | Hao | | H02K 19/103 |
| 10,220,709 B2* | 3/2019 | Malek | | B60L 1/003 |
| 10,293,694 B2* | 5/2019 | Rouille | | B60L 58/27 |
| 10,442,296 B2* | 10/2019 | King | | B60L 58/21 |
| 10,476,287 B2* | 11/2019 | Daniel | | H02J 7/342 |
| 10,549,648 B2* | 2/2020 | King | | B60L 50/51 |
| 10,651,740 B1* | 5/2020 | Zhang | | H02M 7/46 |
| 10,737,578 B2* | 8/2020 | Thieme | | H01M 10/441 |
| 10,933,754 B2* | 3/2021 | King | | B60L 58/18 |
| 11,152,808 B2* | 10/2021 | Langlinais | | H02J 7/00714 |
| 11,165,349 B2* | 11/2021 | Mu | | H02M 1/10 |
| 2001/0033501 A1* | 10/2001 | Nebrigic | | H02M 3/07 363/49 |
| 2003/0111972 A1* | 6/2003 | Strothmann | | B60L 50/00 318/268 |
| 2004/0135544 A1* | 7/2004 | King | | B60L 58/18 320/116 |
| 2004/0135545 A1* | 7/2004 | Fowler | | H01M 10/441 320/118 |
| 2004/0135546 A1* | 7/2004 | Chertok | | B60L 58/18 320/118 |
| 2005/0029872 A1* | 2/2005 | Ehrman | | H02M 1/32 307/11 |
| 2006/0006850 A1* | 1/2006 | Inoue | | H02J 7/007182 323/265 |
| 2006/0043797 A1* | 3/2006 | Hjort | | H02J 7/0048 307/46 |
| 2006/0076171 A1* | 4/2006 | Donnelly | | B60L 50/53 180/65.225 |
| 2008/0191663 A1* | 8/2008 | Fowler | | H02J 7/0018 320/118 |
| 2009/0079417 A1* | 3/2009 | Mort | | H02J 50/10 324/111 |
| 2009/0322148 A1* | 12/2009 | Kitanaka | | B60L 15/2045 320/128 |
| 2010/0225170 A1* | 9/2010 | Hjort | | H02J 7/0047 307/65 |
| 2010/0305770 A1* | 12/2010 | Bhowmik | | B60L 58/18 324/426 |
| 2011/0115436 A1* | 5/2011 | Zhang | | B60L 58/12 320/134 |
| 2011/0227415 A1* | 9/2011 | Hjort | | H02J 7/0047 307/66 |
| 2012/0019231 A1* | 1/2012 | Chen | | H02M 3/158 323/312 |
| 2012/0044014 A1* | 2/2012 | Stratakos | | H02J 1/102 327/530 |
| 2012/0086390 A1* | 4/2012 | Lim | | H02J 7/0019 320/134 |
| 2013/0009470 A1* | 1/2013 | Chuang | | H02J 7/0063 307/31 |
| 2013/0038289 A1* | 2/2013 | Tse | | H02J 7/0013 320/126 |
| 2013/0221921 A1* | 8/2013 | Ang | | B60L 1/003 320/109 |
| 2013/0234686 A1* | 9/2013 | Grant | | H02M 3/28 323/282 |
| 2013/0264865 A1* | 10/2013 | Sugeno | | H02J 3/381 307/19 |
| 2014/0002023 A1* | 1/2014 | Ichikawa | | H02J 7/02 320/109 |
| 2014/0056035 A1* | 2/2014 | Astrom | | H02M 3/33523 363/21.04 |
| 2014/0062348 A1* | 3/2014 | Isayeva | | G05B 9/03 318/139 |
| 2014/0062349 A1* | 3/2014 | Isayeva | | G05B 9/02 318/139 |
| 2014/0277882 A1* | 9/2014 | Isayeva | | B60L 3/003 903/903 |
| 2014/0312828 A1* | 10/2014 | Vo | | H02J 7/0016 429/7 |
| 2015/0115736 A1* | 4/2015 | Snyder | | H02J 7/0048 307/115 |
| 2015/0188331 A1* | 7/2015 | Negru | | H02J 7/0042 320/112 |
| 2015/0202983 A1* | 7/2015 | Le | | B60L 50/16 320/109 |
| 2015/0202984 A1* | 7/2015 | Wyatt | | H01M 10/06 320/109 |
| 2015/0202985 A1* | 7/2015 | Le | | B60L 1/003 320/109 |
| 2015/0210171 A1* | 7/2015 | King | | B60L 50/40 29/825 |
| 2015/0280569 A1* | 10/2015 | Chen | | H02M 3/158 323/312 |
| 2016/0064986 A1* | 3/2016 | Langlinais | | H02J 7/00714 320/134 |
| 2016/0134160 A1* | 5/2016 | Schultz | | H02J 7/0021 307/77 |
| 2016/0137092 A1* | 5/2016 | Thieme | | B60R 16/03 307/10.6 |
| 2016/0214493 A1* | 7/2016 | Herke | | B60L 53/665 |
| 2017/0012443 A1* | 1/2017 | Negru | | G06F 1/26 |
| 2017/0185094 A1* | 6/2017 | Atkinson | | H02J 7/00 |
| 2018/0006479 A1* | 1/2018 | Daniel | | H02J 7/342 |
| 2018/0065491 A1* | 3/2018 | King | | B60L 58/20 |
| 2018/0257506 A1* | 9/2018 | Thieme | | B60W 10/08 |
| 2018/0297476 A1* | 10/2018 | Malek | | B60L 1/003 |
| 2018/0337536 A1* | 11/2018 | Li | | H01M 10/443 |
| 2018/0337545 A1* | 11/2018 | Crosby | | H02M 3/07 |
| 2018/0375364 A1* | 12/2018 | Langlinais | | H02J 7/007182 |

(56) References Cited

U.S. PATENT DOCUMENTS

| | | | | |
|---|---|---|---|---|
| 2019/0165593 | A1* | 5/2019 | Roohparvar | H02J 7/0069 |
| 2019/0381897 | A1* | 12/2019 | King | B60L 50/40 |
| 2020/0139825 | A1* | 5/2020 | King | B60L 50/40 |
| 2020/0295588 | A1* | 9/2020 | Nibir | H02J 7/007182 |
| 2020/0298722 | A1* | 9/2020 | Smolenaers | B60L 53/53 |
| 2020/0304026 | A1* | 9/2020 | Mu | B60L 53/16 |
| 2021/0006076 | A1* | 1/2021 | Rentel | H02J 7/0024 |
| 2021/0006077 | A1* | 1/2021 | Rentel | G01R 31/396 |
| 2021/0028641 | A1* | 1/2021 | Llic | H02J 7/00304 |
| 2021/0178909 | A1* | 6/2021 | King | B60L 15/2045 |
| 2021/0242771 | A1* | 8/2021 | Chen | H02J 7/0068 |
| 2021/0391796 | A1* | 12/2021 | Niehaus | H02M 3/07 |

OTHER PUBLICATIONS

Chung-Ti Hsu, "Increased Energy Delivery for Parallel Battery Packs with No Regulated Bus," A Dissertation Submitted to The Department of Electrical and Computer Engineering In partial fulfillment of the requirements for the degree of Doctor of Philosophy. Northeastern University, Boston, Massachusetts.Mar. 28, 2014.

* cited by examiner

(12) United States Patent

SOURCE BOOTSTRAP POWER CONVERSION FOR THE SAFE AND EFFICIENT INTERCONNECTION OF HOMOGENEOUS OR HETEROGENEOUS ENERGY STORAGE MODULES

GOVERNMENT RIGHTS

This invention was made with government support under the terms of Contract No. W56HZV-17-C-0079 and awarded by the United States Army—Tank Automotive Research, Development and Engineering Center (TARDEC). The government may have certain rights to this invention.

TECHNICAL FIELD

The present disclosure relates generally to methods and systems for management and control of interconnected energy storage modules, such as battery packs, or battery powered modules forming larger energy storage systems.

BACKGROUND

Energy storage modules are sometimes used as building blocks to create larger energy storage systems possessing different desirable properties. Modules are then interconnected in series and/or parallel. Modules are sometimes connected directly to one another and other times a method to regulate the individual power out of each interconnected module is necessary. For instance, battery packs directly interconnected in parallel may not share the load in a desirable way due to internal battery pack differences, such as internal impedance differences among battery packs, on the other hand battery packs in series may need to regulate their individual voltage to accomplish a given regulated terminal voltage for the entire battery interconnection. The conventional approach to interconnect multiple energy storage modules is to interconnect them directly, perhaps with some protection among the interconnected modules, such as fuses in between modules or battery packs, and/or to use DC/DC converters between the battery pack and the point where it connects to the load side to be able to control and regulate the energy out of each module. In the latter approach, the DC/DC converter must transfer all the power from the battery to the load when the system is serving a load. For instance, if battery packs are connected in parallel, each battery pack may connect to other battery packs through a DC/DC converter of suitable power transfer capability to regulate its current and make sure all battery packs share the load equally. Conventional approaches are inefficient and potentially unsafe. Interconnecting the modules directly in parallel is inefficient and potentially unsafe as there could be uncontrollable circulating energy among the modules, and in series interconnections some modules could be under-discharged as some others could still hold some energy. On the other hand, one major disadvantage of using DC/DC converters between modules and load is that the DC/DC converters need to be designed as large as the maximum power the battery needs to deliver when discharging or accept when charging, which results in losses in the system. This is particularly true when the batteries are delivering power to a load as opposed to when the battery is being charged because discharging currents are typically more, but it is true in both directions (i.e., charging or discharging)

SUMMARY

The present embodiments relate to devices and methods used to regulate the power, voltage and/or current out of an individual energy storage module, such as a battery pack or battery cell. A plurality of energy storage modules and/or individual interconnected energy storage modules can form an efficient energy storage system capable of regulating and balancing its energy. The present disclosure can also provide a method for storing and delivering stored energy, comprising an energy storage module that can boost the voltage of the energy storage component while the energy delivered or accepted by the energy storage component does not transfer in its entirety through its associated DC/DC converter This can reduce losses and in turn improves efficiency both while charging or discharging an energy storage module or system Other features and advantages of these embodiments will become apparent from the following detailed description of the presently preferred embodiments taken in conjunction with the accompanying drawings.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
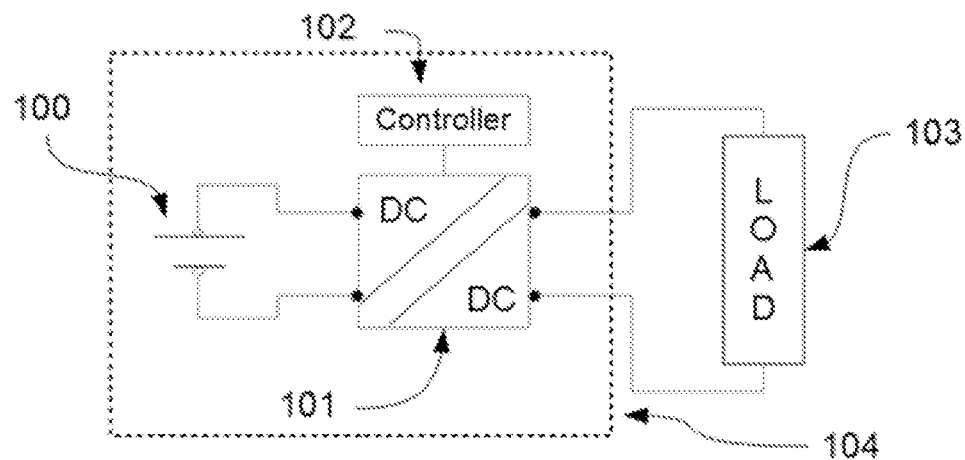
FIG. 1 is an illustration of a conventional approach to regulate the power, voltage or current out of an energy storage module, such as a battery pack.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

It will be readily understood that the components of the present embodiments, as generally described and illustrated in the Figured herein, may be arranged and designed in a wide variety of different configurations. Thus, the following more detailed description of the embodiments of the apparatus, system and/or method, as presented in the Figures, is not intended to limit the scope of the embodiments, as claimed, but merely representative of selected embodiments.

Reference throughout this specification to "a select embodiment," "one embodiments," "some embodiments," or "an embodiment" means that a particular feature, structure, or characteristic described in connection with the embodiment is included in at least one embodiment. Thus, appearances of the phrases "a select embodiment," "one embodiments," "some embodiments," or "an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the embodiments can be practiced without one or more of the specific details, or with other methods, components, materials, etc. In other instances, well known structures, materials, or operations are not shown or described in detail to avoid obscuring aspects of the embodiment.

The embodiments relate to the technical fields of power electronics and some embodiments relate more specifically to electronic management of interconnected energy storage modules. Some embodiments further relate to the distributed power regulation of individual interconnected energy storage modules forming a larger energy storage system. Typically, energy storage modules are used as building blocks to create larger energy storage systems. That is, multiple energy storage modules can be electrically interconnected in series and/or parallel to create energy storage systems that can satisfy the specific requirements of an application. In one embodiment, an energy storage module can be a battery pack. The present disclosure uses the words "module" or "battery" or "battery pack" interchangeably in certain embodiments, and it is understood by one skilled in the art that any energy storage module with electrical energy output is applicable, such as capacitors and super capacitors, among other embodiments. Battery packs may be interconnected in series and/or parallel combinations to create larger batteries or energy systems. The advantages for creating larger energy storage systems using smaller modules are numerous and include, but are not limited to, having more energy capacity, producing higher voltages, incrementing redundancy, increasing development flexibility and evolvability, utilizing complimentary energy storage modules to create a higher performance energy storage system, among others.

The embodiments depart from the conventional approach to solve the problems of conventional approaches by using smaller DC/DC converters connected in such a way as to avoid having all power in or out of their associated batteries flowing through them. In this approach, and considering the direction of energy flow in which the battery is discharged towards a load, part of the energy is delivered to the load by the module or battery itself and part of the energy is delivered by the DC/DC power converter simultaneously. The power converter regulates only the necessary amount of energy out of the battery to accomplish power regulation of each individual module without transferring all the power delivered by the energy storage module (e.g., a battery pack). In the disclosure both battery and power DC/DC converter works synergistically to regulate the power out of each battery pack or module that is part of a larger interconnected energy storage system. This approach is equally useful when modules are interconnected in parallel or in series, and for different or similar energy storage modules, where the difference could mean chemistry, type, age, manufacturing origin, among others. It also applies when the flow of energy if to the battery from a battery charger. The higher efficiency of the disclosure enables users to create energy storage systems that are modular and distributed, but also having—less losses than existing methods, which in turn makes modularity and distributed energy storage systems even more attractive in addition to their intrinsic fault-tolerant advantage. The disclosed systems and methods are directed to overcoming one or more of the shortcomings set forth above and/or other shortcomings of the prior art.

In some embodiments, interconnected energy storage modules can be of the same type and, possibly, of the same manufacturing origin, such as battery packs from the same manufacturer having cells of the same chemistry and interconnected in series or parallel combinations, but in other embodiments it can be advantageous to interconnect energy storage modules of dissimilar properties or even manufacturing origins. The former creates what can be referred to as a homogeneous energy storage system, and the latter a heterogeneous energy storage system. An example of a heterogeneous energy storage system can be the interconnection of battery modules having high capacity capability with energy storage modules having the capability to deliver their energy quickly (i.e., having high power capability), such as certain battery chemistries and capacitors. The combination of dissimilar modules in this manner can result in energy storage systems that can, for instance, last longer and are more efficient at delivering the stored energy in applications having large peak to average load demand ratios.

The embodiments can address the need to regulate power of each exemplary individual energy storage module part of a larger exemplary energy storage system. Reasons for requiring power regulation for each module in an interconnected energy storage system can vary. For example, battery packs in parallel tend to have circulating currents among them that can make their parallel interconnection inefficient if some form of power control or regulation is lacking. This can be due to the presence of circulating currents and unequal load sharing among the paralleled battery packs. Battery packs in series may also require individual power control as they can become imbalanced if their energy can be extracted disregarding their specific and individual state of charge, state of health or remaining useful life. Another reason for exemplary individual power regulation can be the possibility to maintain a fix regulated terminal voltage or a fix terminal current for the entire energy storage system by utilizing distributed and modular DC/DC conversion in every module as opposed to using a single larger DC/DC converter between the interconnected modules and the load. These, and other energy storage modular and distributed applications of the embodiments, may require proper control of the energy extracted out of each energy storage module that can be part of an energy storage system.

The embodiments can also provide methods to perform individual power control or regulation of each individual energy storage module in a larger energy storage system using a distributed and efficient DC/DC power conversion approach. This approach can work regardless of the type, chemistry, manufacturing origin, age, etc., of each individual and interconnected energy storage module, or whether the modules are connected in series or parallel. The embodiments can be used for energy balancing in series interconnections, for controllable load sharing in parallel interconnections, or to provide regulated terminal voltage and/or current to a load in a distributed manner.

In one embodiment, an isolated DC/DC power converter with a single input and a single output can be used to regulate the power out of each interconnected module in an energy storage system. The input of this DC/DC converter can be connected to energy storage module terminals and an output of the DC/DC converter can be in series with the same energy storage module. Such an exemplary bootstrap connection can ensure only a controllable fraction of the energy delivered flows through the DC/DC converter and the other fraction comes directly from the energy storage module, such as a battery. This can accomplish higher efficiency at regulating the power of the energy storage module than conventional approaches because for example, not all of the energy delivered will flow through the converter, and also power regulation can be achieved with a smaller DC/DC power converter. This in turn implies losses will be less and that the losses will be generated on a larger area which also can reduce the size of any cooling approach needed to operate the electronics of the system. The DC/DC power converter can be of any desired isolated topology, such as flyback, forward, half-bridge or full-bridge or any other isolated DC/DC converter topology that can transfer the required power efficiently. Once two or more exemplary energy storage modules are connected to their associated bootstrap DC/DC converter, energy storage modules can then be interconnected with, for instance, other energy storage modules having the same bootstrap DC/DC converter, or simply other energy storage modules. Each bootstrap DC/DC converter can be used to regulate the energy of each associated energy storage module. In parallel interconnections these can, for example, regulate the voltage and current out of each parallel energy storage module, and in series interconnections each bootstrap DC/DC converter can regulate the power out of each energy storage module to accomplish, for example, energy balancing of the energy storage system, or distributed terminal voltage regulation of the entire energy storage system.

In another embodiment, the battery pack can be composed of multiple smaller modules or cells connected in series and parallel. In this additional embodiment an isolated DC/DC converter has multiple inputs and a single output. Each input may connect to the internal cells or internal smaller modules inside its associated battery pack, and the output of the isolated converter can be connected in series with the terminals of the battery packs as before. This can ensure internal battery pack power regulation in addition to external battery pack power regulation. In the embodiment described in the previous paragraph, the DC/DC power converter is only able to regulate at the battery pack level.

A bootstrap DC/DC converter integrated with a battery pack can be used as part of a larger energy storage system where each bootstrap plus battery pack combination module can be interconnected with other energy storage modules, or the bootstrap DC/DC converter can also be used as a single unit that can boost and regulate the terminal voltage of its associated battery pack.

To ensure the energy storage module with a bootstrap DC/DC power converter can power on and off adequately, and to ensure the bootstrap DC/DC converter can be connected and disconnected in and out of the energy module in real-time, two diodes and two one-directional switches can be added to the basic source bootstrap design. In some cases, the internal switches provided by modern battery packs can be reused for this latter purpose as described in more detail in the detailed description.

The embodiments further relate to a bootstrap DC/DC conversion approach in modular interconnected energy storage systems as disclosed herein or its use in individual energy storage modules for applications requiring power regulation, voltage regulation, and/or current regulation and control. Additionally, various embodiments can relate to a method and an apparatus hereafter described to power on and off and connection and disconnection of the bootstrap source DC/DC converter on-the-fly while delivering power to a load.

FIG. 1 illustrates a conventional manner in which an energy storage device delivers power to a load via a DC/DC converter. In other words, a conventional manner in which the power, voltage, and/or current of an energy storage device, such as a battery pack, 100 can be regulated and/or controlled. A DC/DC converter 101 and its associated controller 102 are used between the energy storage device 100 and the load 103. The DC/DC converter 101 must transfer all the power from the battery to the load while maintaining a regulated output. The output connected to the load 103 can be controlled with the assistance of, for instance, feedback taken to the controller 102 from measurements performed on the load 103, based on this feedback the controller 102 drives the DC/DC converter 102 to compensate from any load 103 changes or energy storage device 100 changes affecting the regulation or control goal. The original energy storage device 100 then becomes the new energy storage device 104 with power regulation capability. Conventional energy storage devices 104 such as the energy storage device 100 in FIG. 1 are typically interconnected to form larger energy storage systems.

Figure 2:
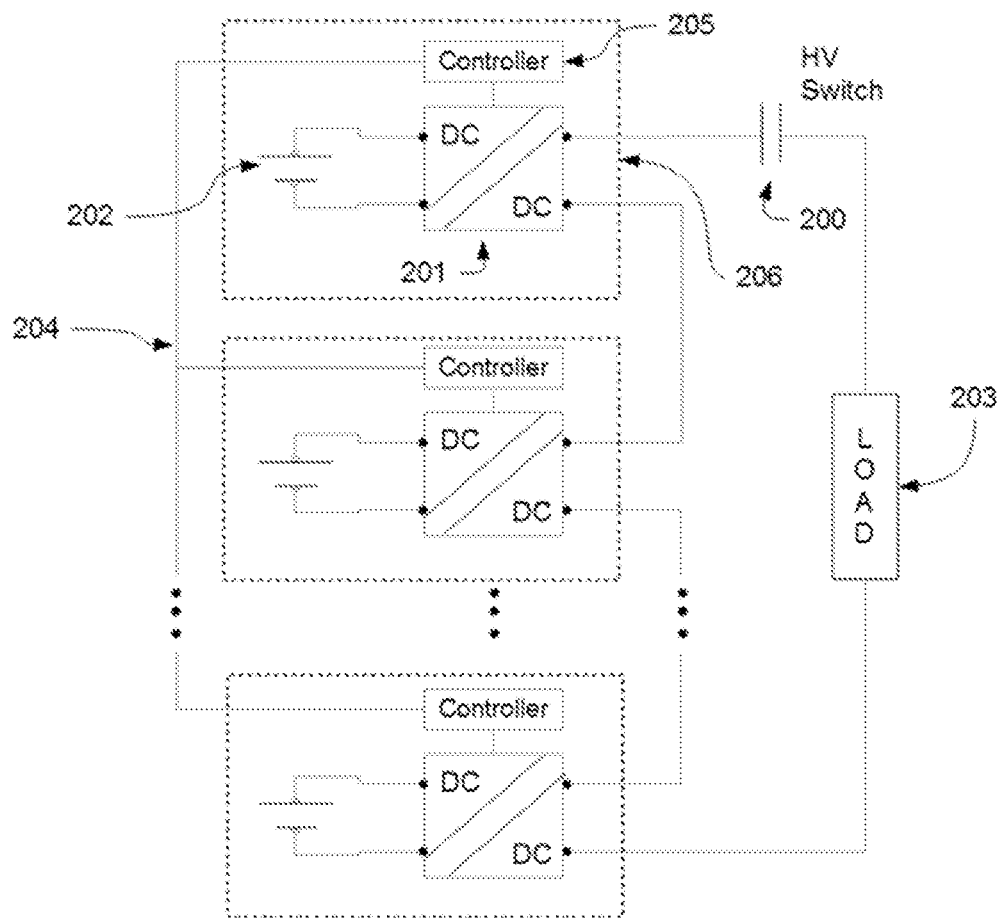
FIG. 2 is an illustration of a conventional approach to regulate the power, voltage or current out of a set of interconnected energy storage modules in series. DC/DC converters are distributed and connected in series and between each battery and load side.

FIG. 2 depicts the way in which these energy storage devices 206 may be connected in series, a high voltage (HV) switch or contactor 200 may be used to connect and disconnect all the energy storage devices 206 from the load 203. A network 204, wired or wireless, may be used to coordinate all the controllers in the interconnected energy storage system.

Figure 3:
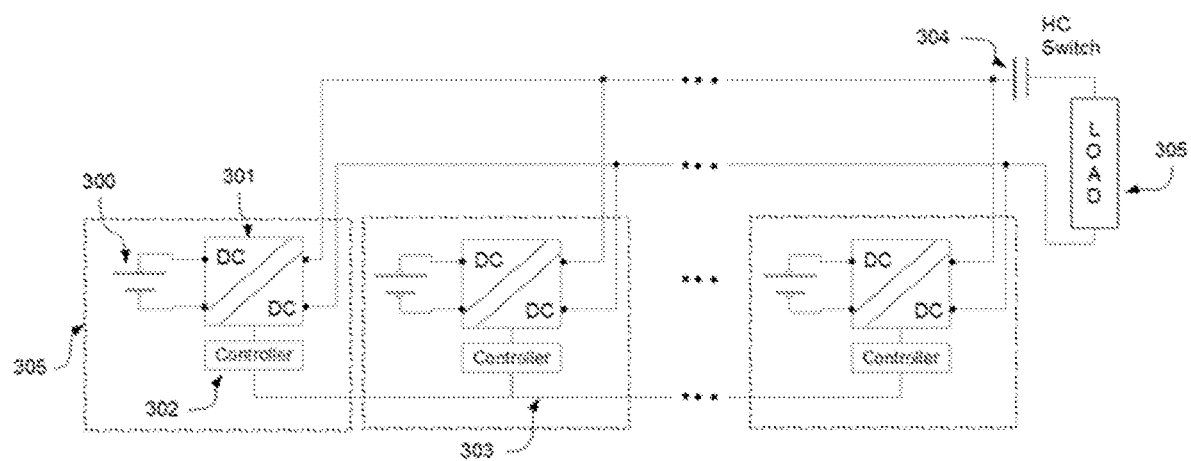
FIG. 3 is an illustration of a conventional approach to regulate the power, voltage or current out of a set of interconnected energy storage modules in parallel. DC/DC converters are distributed and connected in parallel and between each battery and load side.

FIG. 3 depicts conventional energy storage devices 305 interconnected in parallel. In other words, FIG. 3 shows conventionally regulated energy storage devices 305 interconnected in parallel via DC/DC converters 301. A network 303 also can enable communications among controllers 301 to coordinate the energy storage devices 305 towards accomplishing a given power, voltage, or current regulation goal.

Figure 4:
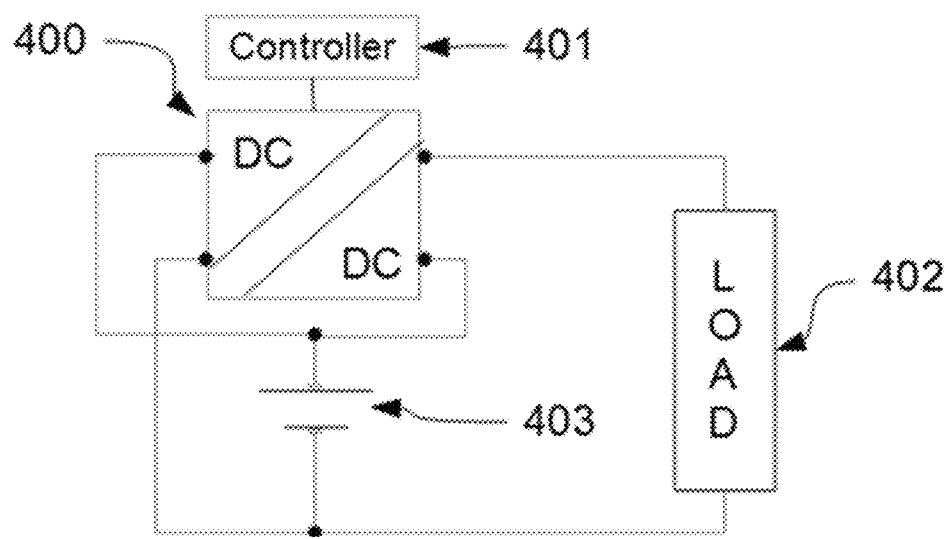
FIG. 4 is schematic of an embodiment for an energy storage module, shown as a battery pack, with a DC/DC converter connected in the bootstrap source mode.

FIG. 4 illustrates a DC/DC converter 400 of the embodiments with associated controller 401 connected to an exemplary energy storage module 403, such as but not limited to a battery pack, in the bootstrap source mode. An input of the DC/DC converter 400 can be connected to the battery pack 403 terminals in parallel and the output of DC/DC converter 400 can be connected in series with battery pack 403 and the load 402. This bootstrap embodiment has an advantage of being able to regulate the power out of the battery pack 403 by transferring a fraction of the power delivered by battery pack 403 through DC/DC converter 400. When the DC/DC converter 400 is active, it can extract energy from the battery pack 403 and can output a voltage that adds to the battery pack 403 voltage. Therefore, the bootstrap source embodiment can only boost the voltage of a battery pack or the energy storage module 403. Many applications may require boosting of a battery pack 403 voltage, for instance, several hybrid and all-electric vehicles boost the voltage of their battery packs with DC/DC converters in the conventional manner shown in FIG. 1 but could implement the devices, systems, and methods of the embodiments.

Figure 5:
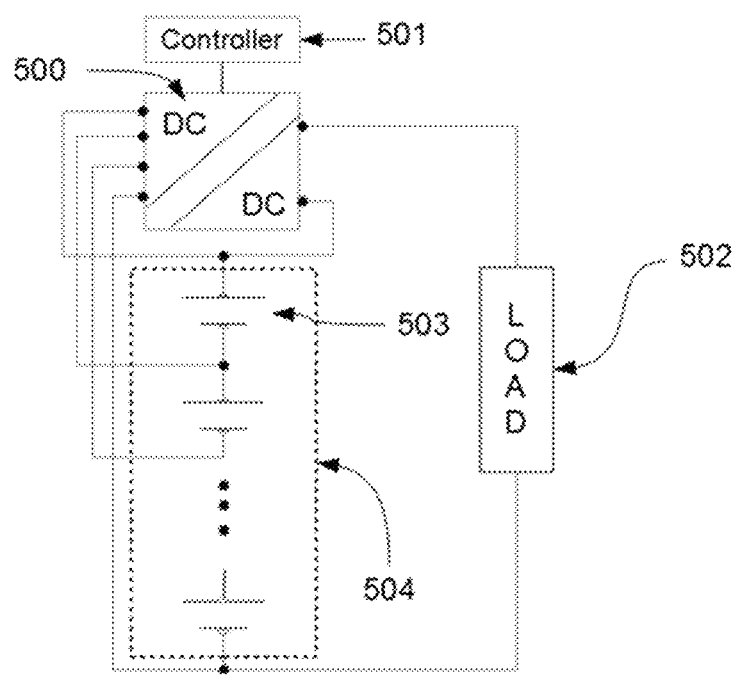
FIG. 5 is schematic of an embodiment for an energy storage module, shown as a battery pack internally composed of series connected cells, connected with a multi-input DC/DC converter in the bootstrap source mode.

Some embodiments further relate to the use of the bootstrap source embodiment to create power controllable energy storage modules, and the interconnection of these power controllable modules can form larger energy storage systems with exemplary aspects related to their start up, shut down, and real-time or on-the-fly operation. FIG. 5 depicts the schematic of one embodiment of the bootstrap source approach on an energy storage module 504 such as, but not limited to, a battery pack 504 composed of multiple internal cells or smaller batteries 503 referred hereafter as cells. These cells can be one single cell, or can be a parallel or series combinations of multiple cells. The embodiment in FIG. 5 further comprises an energy storage module 504 with a multi-input single-output (MISO) DC/DC converter 500 connected in the bootstrap source mode. The DC/DC converter 500 can have multiple inputs and a single output. Inputs can be connected to each predetermine cell and the output of the battery pack 504 can be connected in series with DC/DC converter 500 and the load 502. This embodiment can be used, for instance, to extract energy out of each cell proportionally to their state of charge (SOC) or state of health (SOH) or Remaining Useful Life (RUL).

The bootstrap source embodiment can use any isolated or non-isolated DC/DC converter, some of which include, but are not limited to, flyback, forward, half-bridge, full-bridge, buck, boost converters etc. FIG. 4 and FIG. 5 can convey the general principle of the bootstrap source embodiment, and as shown may be useful in certain scenarios and applications. The bootstrap source embodiment as shown either in the embodiment in FIG. 4 or the embodiment in FIG. 5 can allow the current to flow from the battery pack to the load even when the DC/DC converter 400 or 500, respectively, is inactive or off. This can be because the secondary side of all these converters allows the power to transfer in that direction freely through diodes. These diodes can be either explicit diodes (discrete diode components) in conventional rectifiers, and/or body diodes part of, say, MOSFET transistors in synchronous rectifiers. A method to control these currents can be desirable in some cases, and may be solved with a simple series switch between the battery pack 403, 504 and the negative output of the DC/DC converter 400, 500, or between the positive output of the DC/DC converter 400, 500 and the load. Another disadvantage of the embodiment as shown in FIG. 4 and FIG. 5 is that the DC/DC converter is always connected to the output of the battery pack 403, 504. In some embodiments, it can be desirable to by-pass the DC/DC converter 400, 500 and let the battery pack 403, 504 deliver the power to the load by itself and in its entirety. For example, when the embodiments can be used to start and power a vehicle it can sometimes be preferred to let the battery pack 403, 504 start a vehicle (not shown) by itself and use the DC/DC converter 400, 500 when the load has stabilized. Another embodiment can allow more controllability to resolve these two situations.

Figure 6:
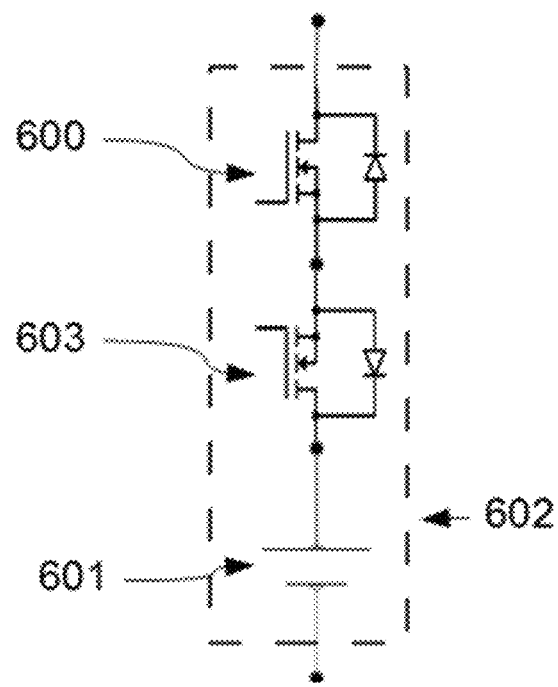
FIG. 6 is schematic of a typical modern battery pack composed of the battery pack itself and a solid-state switch implemented with back-to-back transistors. A battery management system (BMS) is also typically present but not shown in the picture.

To understand additional embodiments, reference is made to FIG. 6 where a conventional, or typical, modern battery pack 602 is shown. Battery packs 601 that are part of an energy storage device sometimes use a series switch that is typically implemented using back-to-back transistors or MOSFETs 600 and 603 for bi-directional current switching. Battery packs 601 could be capacitors or other energy storage devices, and could be a single cell or a battery pack which is an interconnection of multiple cells. Some manufacturers add switches, which are represented as 600 and 603 as N-MOSFETs. That is, 600 may be one or more transistors in parallel, and 603 may be one or more transistors in parallel. The actual transistor types 600 and 603 may be MOSFETs, such as those based on SiC, Si, o GaN, etc., of the N-type or P-Type, or other types of transistors such as BJTs or IGBTs. For simplicity these switches are represented as N-MOSFETs. Typical modern battery packs or energy storage modules have a solid-state switch in series. The switch is typically used for on/off control and protection. MOSFETs are shown in FIG. 6 as a possible example, but other transistor types are possible. The switches are also typically bi-directional to fully disconnected the energy storage module from the system. The switch is used to open and close the circuit for control and for protection, among others. That is, users can manually, remotely, or automatically open or close switches when a fault is detected, such as an over-current or over-temperature conditions, or simply when the module is to be disconnected from the system. Typically, Lithium-based, or high power energy storage devices have these switches internally into their package. Additional to the battery and the switches, high power dense or energy dense energy storage devices have a management system for monitoring (not shown. In FIG. 6), typically referred to as a Battery Management System (BMS).

Figure 7:
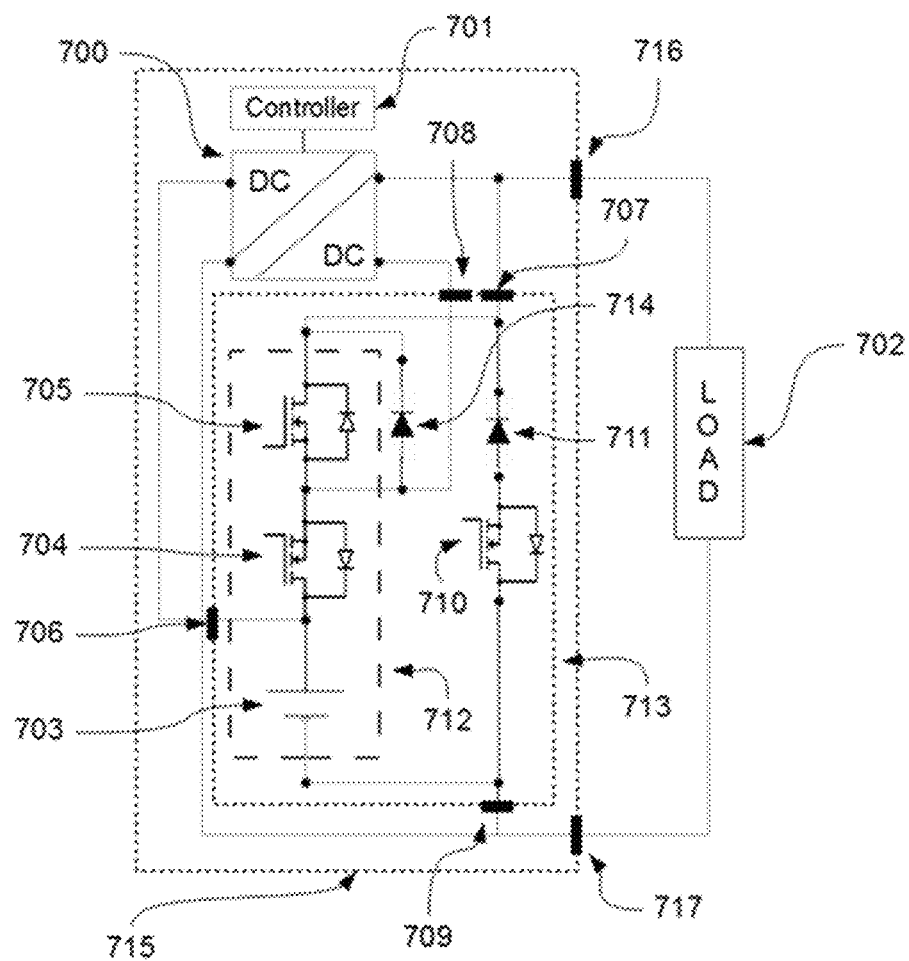
FIG. 7 is an illustration of an embodiment for a Bootstrap source DC/DC converter connected to a battery pack and leveraging the existing solid-state switch in the module to ensure adequate start-up, turn down and real-time transitions of the bootstrap source mode in an energy storage module.

FIG. 7 shows an embodiment of an bootstrap source energy storage module 715 that can use hardware such as battery pack 602 and its equivalents. This embodiment can leverage the existing switch in the energy storage device 713 composed of transistors 704 and 705 and adds a diode 711 and a transistor 710 that can enable full controllability of the bootstrap source energy storage module 715.

In FIG. 7, a bootstrap source energy storage module 715 can comprise DC/DC converter 700, associated controller 701 and energy storage device 713. Bootstrap source energy storage module 715 can comprise a battery pack 703, or any other storage element with electrical output, such as but not limited to a super capacitor and battery combination, in series with transistors 704 and 705 and diodes 714, 711, and transistor 710. In some embodiments, BMS and additional monitoring electronics or balancing circuits may be part of energy storage device 713 and bootstrap source energy storage module 715 but is not shown in FIG. 7. The energy storage device 713 can connect to bootstrap source energy storage module 715 via connections 706, 707, 708, and 709. Module 715 can connect to a load 702 via connectors 716 and 717. In an embodiment, the DC/DC converter 700 can be connected to the energy storage device 713, in this case a battery pack with solid state switches 704, 705, 710, and diodes 711 and 714, and leveraging the existing solid state switches 704 and 705 in the device 713 to ensure adequate start-up, turn down and real-time transitions of the bootstrap source mode in the bootstrap source energy storage module 715.

The bootstrap source energy storage module 715 can be disconnected from the load by turning off, or keeping off transistor 704, transistor 705, and the DC/DC converter 700. This can ensure no current flows to the load or through DC/DC converter 700 secondary. A switch formed by transistors 704 and 705 may be part of an existing energy storage device 712, that is they may be inside and integrated with a, say, battery. DC/DC converter 700 may be one or more converters in parallel or series and may be connected as shown either in FIG. 4 or FIG. 5. The following embodiments comprise two scenarios where switching transitions are performed to change bootstrap source energy storage module 715 mode between an exemplary battery pack only mode and an energy bootstrap source mode. This mode change functionality of bootstrap energy storage module 715 can be implemented with the embodiment of FIG. 7, and can be useful for startup, shut down, or adaptation of the bootstrap source energy storage module 715 to different load demands.

In one embodiment, bootstrap source energy storage module 715 in FIG. 7 may start up connected to the load 702 as a battery pack 703 in series with the series solid state switch composed of transistors 704 and 705. That is, bootstrap source energy storage module 715 can behave as energy storage module 713, which can be, for example, battery 703 without DC/DC converter 700 between battery and load. This can be accomplished by turning transistors 704 and 705 from off (open) to on (close) and keeping the DC/DC converter 700 off. The output of the DC/DC converter 700 can be kept at close to zero volts (i.e., short circuit) by switch 705. This can eliminate any current through the secondary of the DC/DC converter 700 when it is off. After bootstrap energy storage module 715 starts up as energy storage device 713 (i.e., a battery pack 703 in series with its switch formed by 704 and 705), it can be commanded on-the-fly to operate in bootstrap source mode if desired by first opening transistor 705 and quickly thereafter turning on and ramping up the DC/DC converter 700 to the desired output power or voltage level. After transistor 705 opens, the current to the load is not interrupted as it flows through the parallel combination of diode 714 and the body diode of transistor 705. Therefore, after transistor 705 opens, the voltage in the load transitions from battery voltage minus a small voltage drop in closed transistors 704 and 705, to battery voltage minus a voltage drop in diodes 714 and body diode of transistor 705 plus a voltage drop in closed transistor 704. Briefly afterwards transistor 705 can be opened, DC/DC converter 700 is turned on, and ramped up, which applies a reverse voltage on diode 714 and the body diode of transistor 705, which causes the diode 714 to open and the bootstrap source energy storage module 715 transitions to the bootstrap source mode without current interruption and approximately from battery pack 703 voltage up. At the moment transistor 705 opens, a forward diode voltage drop of typically less than or equal to 0.7V can be applied to the secondary output of DC/DC converter 700, which cannot cause a current to start flowing through the secondary of DC/DC converter 700 because it is insufficient to make the rectifier in the secondary of DC/DC converter 700 to start conducting. Therefore, most, if not all, current can flow from battery pack 703 up through transistor 704 and diode 714 to the load 702.

In another embodiment, the bootstrap source energy storage module 715 in FIG. 7 may start up connected to the load 702 in source bootstrap mode by first keeping transistor 705 off and turning transistor 704 from off to on. This can connect the DC/DC converter 700, which is currently off or disable, in bootstrap source mode to the battery pack 703. Most, if not all, current flows through transistor 704, body diode of transistor 705, and diode 714 to the load 702. Briefly after, or simultaneously to, transistor 704 closing, DC/DC converter 700 can be enabled and turned on to minimize the current flowing through the body diode of transistor 705 and diode 714. Thereafter, DC/DC converter 700 can be adjusted as desired to extract power from the battery pack 703 as needed. Bootstrap source energy storage module 715 can now transition on-the-fly to the battery pack 703 only mode if desired. At this point transistor 704 can be on and transistor 705 can be open while DC/DC converter 700 is on transferring power. To transition to battery pack 703 only mode, the DC/DC converter 700 is turned off. This removes the reverse voltage on the parallel body diode of transistor 705 and diode 714, and current will flow from the battery pack 703 to the load via transistor 704, diodes 714, and body diode in transistor 705. This happens again without current being interrupted. After 700 is off transistor 705 can be closed to minimize losses in the body diode of 705 and diode 714 and the module 715 can now be in the battery pack only mode. DC/DC converter 700 may ramp down to a voltage as small as possible before turning off to make sure the voltage transition can be smooth from bootstrap source mode to battery pack only mode.

Performing the switching actions in the order previously described can ensure that the bootstrap source energy storage module 715 can be connected to the load as a battery pack without DC/DC conversion or as a battery pack with bootstrap source DC/DC conversion. The former can be called battery pack only mode and the latter source bootstrap mode. On-the-fly transition from one mode to the other can be possible without current being interrupted.

Figure 8:
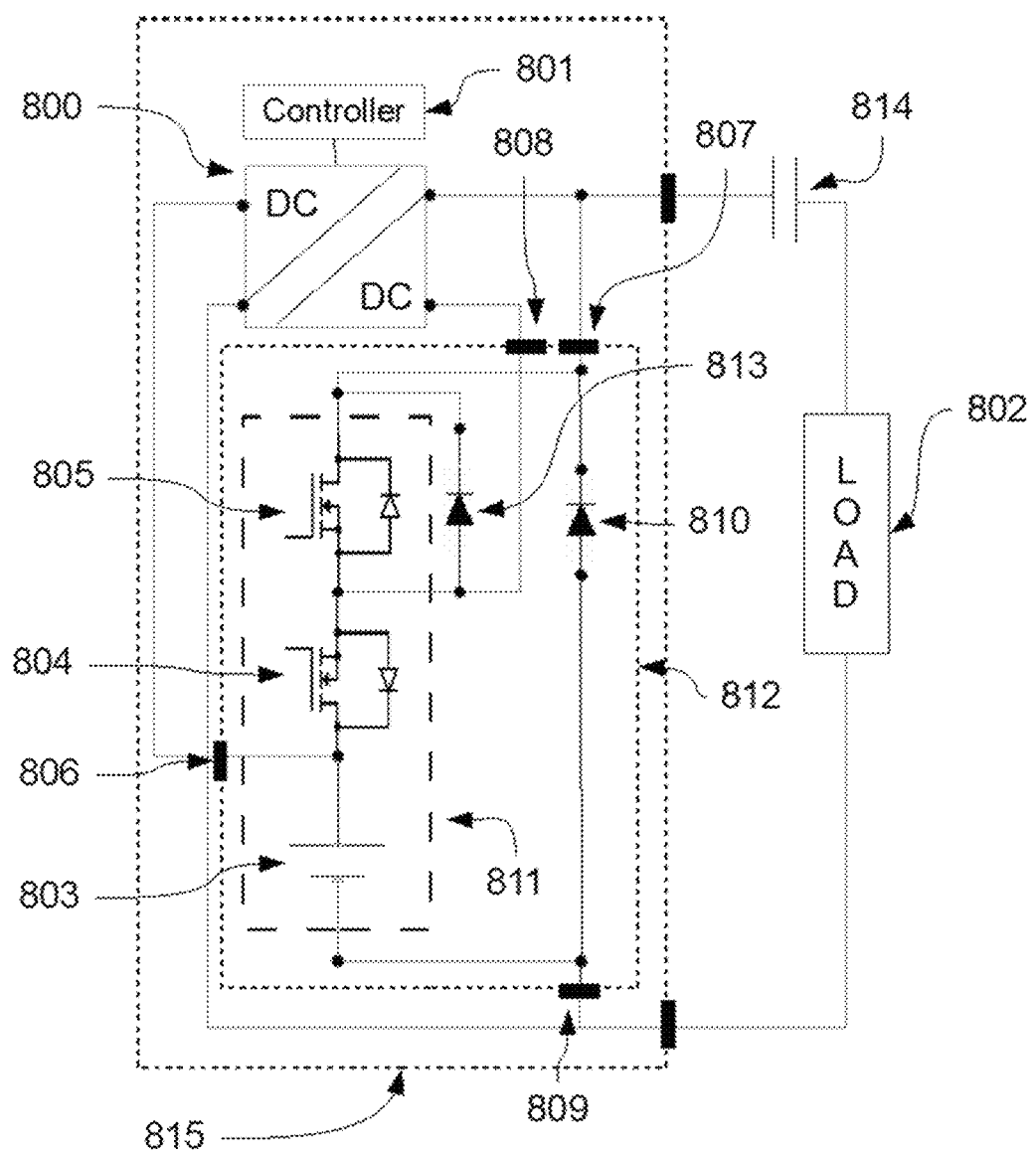
FIG. 8 is an alternative embodiment to the embodiment of FIG. 7.

In FIG. 7, optional diode 711 and transistor 710 can be used to ensure low voltage turn off or disconnection of module 715. Assume bootstrap source energy storage module 715 is delivering power to the load in battery pack only mode. That is, transistors 704 and 705 can be on and DC/DC converter 700 can be off. This state may be reached prior to disconnecting module 715 from the load. If the load has some inductive characteristics, opening transistors 704 and 705 may be detrimental for the switches because the abrupt current interruption may cause high voltage levels on the transistors 704, 705, which may necessitate the of high voltage transistors. However, maintaining transistor 710 on briefly before transistors 704 and 705 open can provide a path for the current to flow and decay through diode 711, and in that case transistors 704 and 705 may be of the low voltage and high current type. After current has decayed sufficiently low, as determined by the application and the transistor capability, transistor 710 can be opened to fully disconnect module 715 from the load if needed, otherwise if transistor 710 is not used, bootstrap source energy storage module 715 can be a diode in its terminals, which may be acceptable in some applications. In an embodiment, diode 714 and transistor 710 are optional. Another embodiment that replaces diode 711 and transistor 710 can use a high voltage and/or high current contactor 814, as shown in FIG. 8, and external to the bootstrap source energy storage module 715. FIG. 8 is an alternative embodiment of the embodiment in FIG. 7, which can use contactor or switch 814 to replace 711 and 710 in FIG. 7. The embodiment of FIG. 8 comprises an alternative approach for Bootstrap source DC/DC converter 800 adequate start-up, turn down and real-time transitions of the bootstrap source mode in the bootstrap source energy storage module 815. In FIG. 8, 812 is an energy storage device with solid state switches for proper on/off control and connections to the DC/DC converter associated with it and for creating the bootstrap source energy storage module 815. 812 is analogous to 713 in FIG. 7. In FIG. 8, 811 is a battery pack with solid state switches, which is typical of many battery packs such as lithium-ion battery packs. Battery pack 811 is analogous to 712 in FIG. 7. In FIG. 7, note that transistor 710 can be maintained opened if abrupt current interruption through transistors 704 and 705 is desired for protection reasons, and transistor 710 can be closed when a soft shut down is desired by letting the current decay. In some embodiments, the exemplary methods shown in FIG. 7 and FIG. 8 can be combined for additional controllability.

Figure 9:
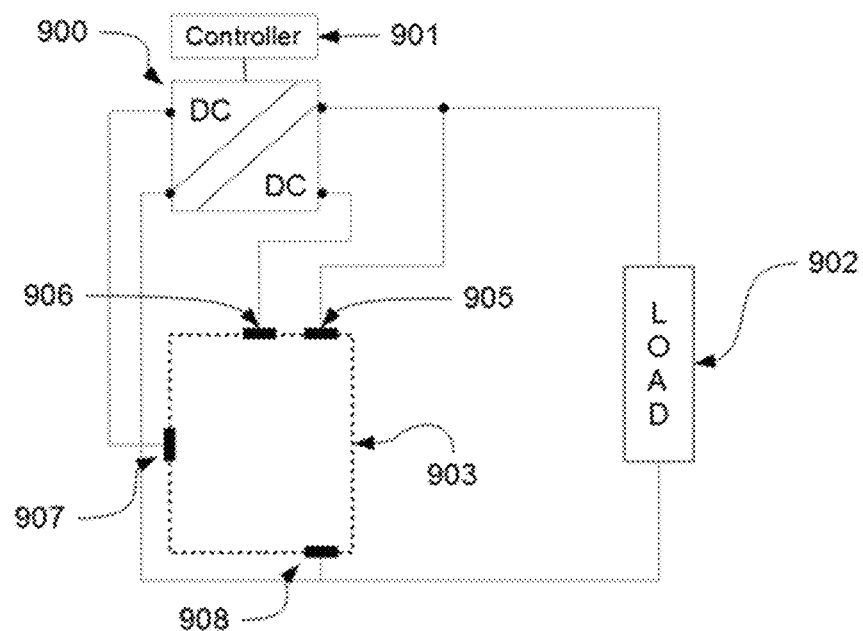
FIG. 9 a simplified version of FIG. 7 where an energy storage module, switches and diodes are inside block 903.

FIG. 9 depicts a simplified high level view of the embodiments of FIG. 7 or FIG. 8. In FIG. 9, energy storage module 903 can be equivalent to either energy storage module 713 in FIG. 7 or 812 in FIG. 8. DC/DC converter 900 and associated controller 901 can be connected to energy storage module 903 via connectors 905, 906, 907, and 908, and from there to the load 902. The connectors 905, 906, 907, and 908 can be equivalent to the connectors shown in FIG. 7 or FIG. 8. The embodiment illustrated in FIG. 9 can be used in FIG. 10 and FIG. 11, where multiple of embodiments are interconnected in series and parallel respectively as an example of how to create exemplary larger energy storage systems using the embodiments described in FIG. 7 or FIG. 8.

Figure 10:
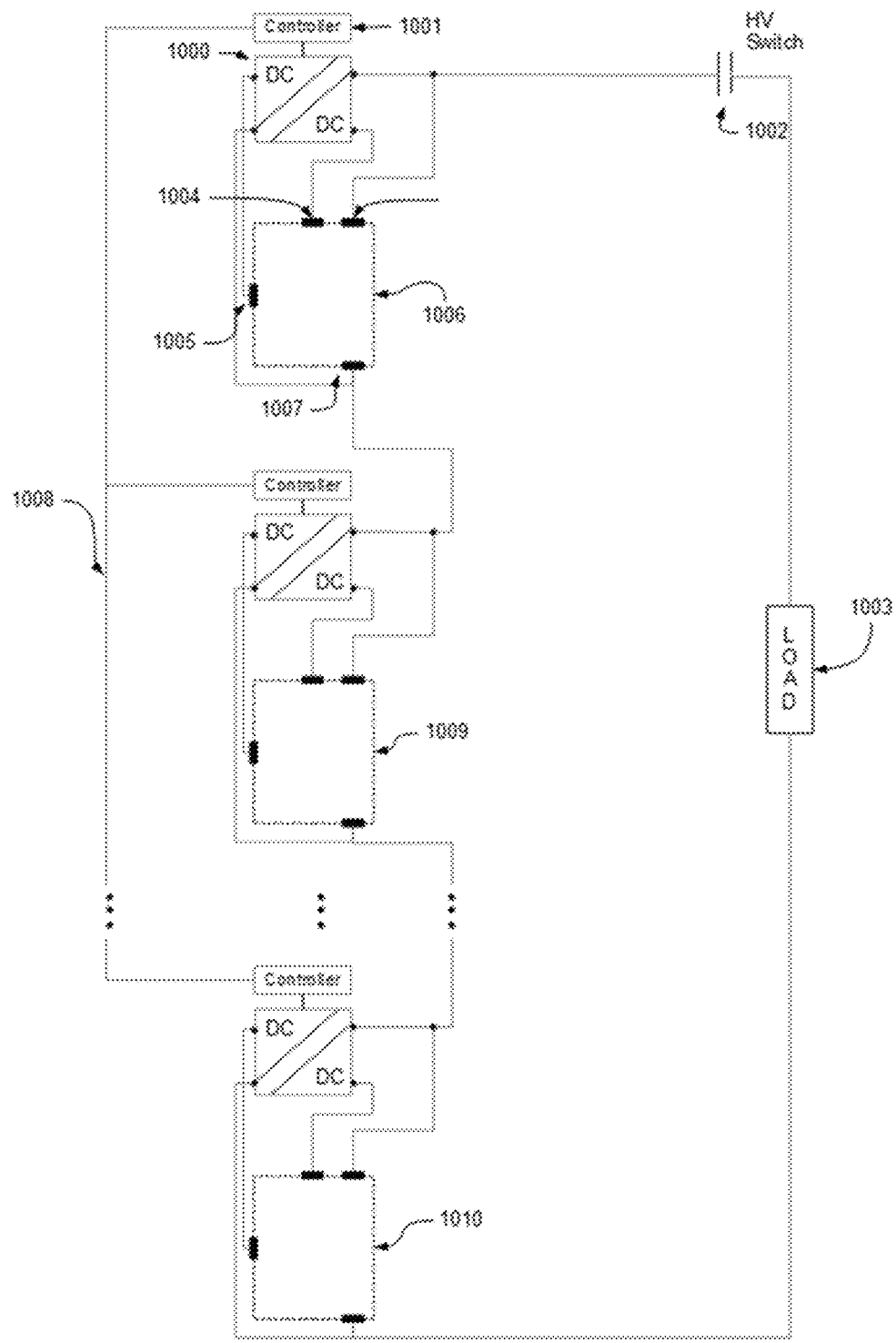
FIG. 10 is an embodiment for a series interconnection of the energy storage module of FIG. 9.

FIG. 10 depicts a system of series interconnection energy storage modules according to the embodiments. A network 1008, wired or wireless, may be used to coordinate the power regulation, voltage and/or current control of every energy storage module in a distributed or centralized manner. A High Voltage (HV) switch, contactor or relay 1002 may be used to disconnect the entire system from the load 1003. Every module, for instance, 1006, 1009, or 1010 may have an energy storage unit inside that is of a different or same type, such as battery, capacitor, or a combination thereof, different or same chemistry, different or same manufacturing origin, different or similar age, health or state of charge for example. The DC/DC converters 1000 can be used to adjust and compensate for these differences in any desired manner to say extract all the energy of each energy storage element in a balanced manner, and/or generate a regulated terminal load voltage and/or load current. In an embodiment, transitions between battery pack only and source bootstrap mode are possible on the fly without current interruption if using the embodiment of FIG. 7 in place of 1006, 1009, and 1010 blocks.

Figure 11:
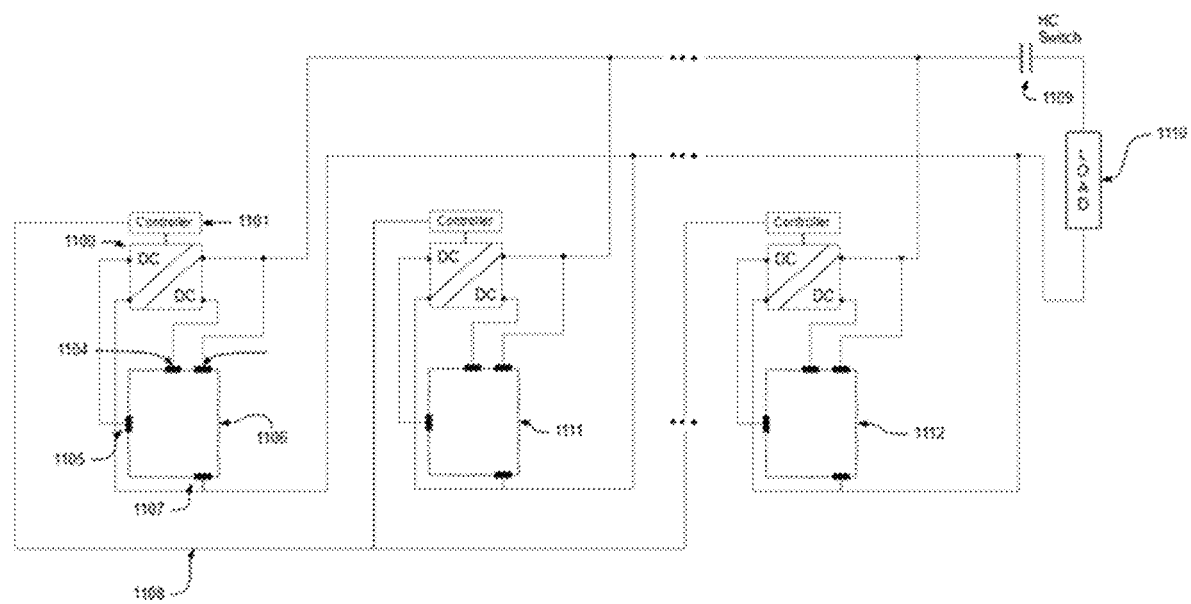
FIG. 11 is an embodiment for a parallel interconnection of the module of FIG. 9.

FIG. 11 depicts a system comprising parallel interconnection energy storage modules according to the embodiments. A network 1108, wired or wireless, may be used to coordinate the power regulation, voltage and/or current control of every energy storage module 1106, 1111, 1112 in a distributed or centralized manner. A High Current (HC) switch, contactor or relay 1109 may be used to disconnect the entire system from the load 1110. Every energy storage module, for instance, 1106, 1011, or 1012 may have an energy storage unit inside that can be of a different or same type, such as battery, capacitor, or a combination thereof, different or same chemistry, different or same manufacturing origin, different or similar age, health or state of charge. DC/DC converters, such as 1100, can be used to adjust and compensate for these differences in any desired manner and can extract all the energy of each energy storage element in a balanced manner, avoid circulating currents in parallel for a balance share of the load among all modules, and/or generate a regulated terminal load voltage and/or load current, among others.

Some embodiments as shown in FIG. 4 and FIG. 7 illustrate embodiments connecting energy storage modules in parallel using exemplary Lithium-ion 6T battery packs having 28V and 60 Ah. Lithium-ion 6T battery packs represent one of the non-limiting possible examples where the embodiments can be implemented. Several experiments were carried out by paralleling similar and dissimilar 6T battery packs at load current levels of 30A. Control over current was demonstrated without describing or showing the details of the approach.

In an embodiment, a source bootstrap approach of connecting isolated DC/DC converters to energy storage modules can be more efficient as it transfers a fraction of the power through the DC/DC converter as compared to a conventional approach using a DC/DC converter between energy storage module and load. This approach targets modular energy storage units and energy storage systems created with smaller energy storage modules in which the power, voltage, and/or current of every individual module needs to be regulated and/or controlled. The source bootstrap approach of the embodiments of FIG. 4 and FIG. 5 can be implemented, or if more controllability of their start up, shut down and on-the-fly operation is needed, the embodiments in FIG. 7 and FIG. 8 can be used or combined.

The embodiments include approaches and apparatuses used to regulate the power, voltage and/or current out of individual energy storage devices and/or individual interconnected energy storage modules forming a larger energy storage system. The source bootstrap approach of connecting DC/DC converters to energy storage modules is more efficient as it transfers a fraction of the power through the DC/DC converter as compared to a conventional approach using a DC/DC converter between energy storage module and load. This approach targets modular energy storage units and energy storage systems created with smaller energy storage modules in which the power, voltage, and/or current of every individual module needs to be regulated and/or controlled. The source bootstrap approach may be used as shown in the embodiments of FIG. 4 and FIG. 5, or if more controllability of their strap up, shut down and on-the-fly operation is needed, the embodiments in FIG. 7 and FIG. 8 can be used or combined.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A device for source bootstrap power conversion, comprising:
   a DC/DC converter;
   an energy storage module operationally connected to the DC/DC converter and a load; and
   a controller operationally connected to the DC/DC converter and the energy storage module,
   wherein an input to the DC/DC converter is connected to an output of the energy storage module in parallel, and an output of the DC/DC converter is connected in a T-circuit with the energy storage module and the load,
   wherein the controller regulates the power out of the energy storage module by directing a fraction of power delivered by the energy storage module through the DC/DC converter to the load, and
   wherein when the DC/DC converter is active, the DC/DC converter receives voltage from the energy storage module and outputs a boosted voltage to the load that adds to an output voltage from the energy storage module to the load, and wherein a ground line of the output of the DC-DC converter connects to a universal ground line of both the load and the energy storage module by flowing through the energy storage module.

2. The device for source bootstrap power conversion of claim 1, wherein the energy storage module includes a plurality of battery cells, each battery cell being operationally connected to the controller, and wherein the DC/DC converter has multiple inputs, each of the inputs being connected to each of an output from each said battery cell.

3. The device for source bootstrap power conversion of claim 1, further comprising:

a plurality of solid state switches operationally connected to the controller, the DC/DC converter and the energy storage module, wherein the switches enable uninterrupted current flow while reconfiguring the energy storage module between supplying voltage to the load directly and supplying boosted voltage to the load through the DC/DC converter.

4. The system of claim 1, wherein the DC/DC converter can maintain an output voltage regulated while extracting more or less energy from the energy storage module.

5. A system for source bootstrap power conversion, comprising:

a DC/DC converter adapted to be connected to an energy storage module;

a controller connected to the DC/DC converter and adapted to be connected to the energy storage module, wherein an input of the DC/DC converter is adapted to be connected to the energy storage module in parallel, and an output of the DC/DC converter is adapted to be connected in a T-circuit to the energy storage module and in a T-circuit to a load, wherein, when the DC/DC converter is connected to the energy storage module and the load, the energy storage module is connected to the load, and the controller is connected to the energy storage module, the controller regulates power out of the energy storage module by transferring a fraction of the power delivered by the energy storage module to the DC/DC converter, and wherein when the DC/DC converter is activated by the controller, the DC/DC converter extracts energy from the energy storage module and adds output voltage to boost a voltage output of the energy storage module to the load, and wherein a ground line of the output of the DC-DC converter connects to a universal ground line of both the load and the energy storage module by flowing through the energy storage module.

6. The system of claim 5, wherein the DC/DC converter comprises multi-inputs and wherein each of the multi-inputs are adapted to connect in series to each of a battery cell output of a multi-cell energy storage module.

7. The system of claim 6, wherein, when each of the DC/DC multi-inputs are connected to each of the battery cell outputs, the controller the controller regulates the DC/DC converter to extract energy out of each said battery cell.

8. The system of claim 7, wherein the controller regulates the DC/DC converter to extract energy out of each said battery cell according to one or more of each said battery cell's state of charge, state of health, or remaining useful life.

* * * * *